United States Patent
Choi et al.

(10) Patent No.: US 12,465,254 B2
(45) Date of Patent: Nov. 11, 2025

(54) INCABIN SENSOR FOR PREDICTING DRIVER STATE USING RADAR AND DRIVER STATE PREDICTING METHOD

(71) Applicant: THINK-I CO., LTD., Yongin-si (KR)

(72) Inventors: Sung Kuk Choi, Yongin-si (KR); Kwan Su Kang, Seoul (KR)

(73) Assignee: THINK-I CO., LTD., Yongin-si (KR)

( * ) Notice: Subject to any disclaimer, the term of this patent is extended or adjusted under 35 U.S.C. 154(b) by 0 days.

(21) Appl. No.: 18/820,628

(22) Filed: Aug. 30, 2024

(65) Prior Publication Data
US 2025/0090062 A1    Mar. 20, 2025

(30) Foreign Application Priority Data

Sep. 18, 2023 (KR) .................. 10-2023-0124058

(51) Int. Cl.
  *A61B 5/18*   (2006.01)
  *A61B 5/00*   (2006.01)
  *A61B 5/0205* (2006.01)
  *A61B 5/05*   (2021.01)

(52) U.S. Cl.
  CPC .............. *A61B 5/18* (2013.01); *A61B 5/0205* (2013.01); *A61B 5/05* (2013.01); *A61B 5/7246* (2013.01); *A61B 5/7275* (2013.01)

(58) Field of Classification Search
  CPC ....... A61B 5/18; A61B 5/0205; A61B 5/4809; A61B 5/024; A61B 5/0816; A61B 2503/22

USPC .................. 701/1, 3, 23, 25, 36, 48, 49; 340/438–439
See application file for complete search history.

(56) References Cited

U.S. PATENT DOCUMENTS

| | | | | |
|---|---|---|---|---|
| 8,725,311 B1 * | 5/2014 | Breed | ............. | A61B 5/11 701/1 |
| 2017/0231545 A1 * | 8/2017 | Shinar | ............. | A61B 5/11 702/150 |

FOREIGN PATENT DOCUMENTS

| | | | | |
|---|---|---|---|---|
| CN | 107374603 A | * | 11/2017 | ......... A61B 5/02055 |
| KR | 20180104369 A | | 9/2018 | |
| KR | 20230077605 A | | 6/2023 | |
| WO | WO-2018105459 A1 | * | 6/2018 | ........... A61B 5/0245 |

* cited by examiner

*Primary Examiner* — Boniface N Nganga
(74) *Attorney, Agent, or Firm* — STIP Law Group, LLC

(57) ABSTRACT

Disclosed are an in-cabin safety sensor for predicting a driver state and its driver state predicting method. The in-cabin safety sensor for predicting a driver state using radar of the present invention may count a driver's heart rate and/or respiratory rate using radar, and may monitor changes in the driver's heart rate or respiratory rate to predict driver's drug use, hypoglycemic shock, etc., in which the driver's heart rate per minute counted in real time is higher than the reference heart rate or the driver's respiratory rate per minute is higher than the reference respiratory rate, in addition to driver's drowsy driving or preliminary drowsy driving in which driver's heart rate per minute counted in real time is slower than a reference heart rate or driver's respiratory rate per minute is lower than a reference respiratory rate.

12 Claims, 4 Drawing Sheets

INCABIN SENSOR FOR PREDICTING DRIVER STATE USING RADAR AND DRIVER STATE PREDICTING METHOD

CROSS-REFERENCE TO RELATED APPLICATION

This application claims priority to and the benefit of Korean Patent Application No. KR 10-2023-0124058, filed on Sep. 18, 2023, the disclosure of which is incorporated herein by reference in its entirety.

BACKGROUND

1. Field of the Invention

The present invention relates to a driver state predicting method and an in-cabin safety sensor using the same that may count a driver's heart rate in a non-contact manner using radar and predict driver's drowsy driving, drug use, hypoglycemic shock, etc., by monitoring changes in the driver's heart rate.

2. Discussion of Related Art

When a driver's attention is distracted due to drowsy or inattention while driving a vehicle, it will inevitably lead to an accident. Neglecting to look ahead even for a moment due to drowsy while driving, smoking while driving, or distraction while driving may quickly lead to an accident. Various driving assistance devices are being developed because the consequences of inattention are too great to leave such a situation to the driver's own care.

There are several ways to recognize drowsy driving or inattentive driving. A method of photographing a driver with a camera and aAAnalyzing images is mainly used. Lane departure information from intelligent Advanced Driver Assistance Systems (ADAS) may be used to recognize the situation of being driver's inattentive driving. In the method of analyzing camera images, the driver's face, especially the movement of the driver's eyes, is analyzed through the images to determine whether the driver is in a drowsy state or an inattentive state. In the method of analyzing camera images, when the driver is determined to be drowsy or distracted, a warning is issued to the driver in visual, auditory, and tactile ways using its own device or the vehicle's internal system. Despite the warnings provided by driving assistance devices, a better situation may not be made and the driver may continue in a drowsy state or inattentive state. In these cases, it is necessary to notify an external device of the driver's state.

The problem is that when drowsy driving is determined using the camera images, the driver is already in a drowsy driving state, and the drowsy driving cannot be predicted using the image processing methods developed to date.

Meanwhile, a very dangerous situation may occur when the driver drives while taking drugs or experiences hypoglycemic shock while driving, in addition to the driver's drowsy driving. When the driver is taking drugs or is experiencing hypoglycemic shock, the driver's heart rate increases. Conversely, when the driver is drowsy, the heart rate decreases.

Examples of the related art include KR 10-2018-0104369 A (Method and device for recognizing occupant state using radar) and KR 10-2023-0077605 A (Respiratory rate estimation device and method using Doppler velocity based on FMCW radar).

SUMMARY OF THE INVENTION

The present invention is directed to providing a driver state predicting method and an in-cabin safety sensor using the same that may count a driver's heart rate in a non-contact manner using radar and may predict driver's drowsy driving, drug use, hypoglycemic shock, etc., by monitoring changes in the driver's heart rate or respiratory rate.

According to an aspect of the present invention, there is provided a driver state predicting method of an in-cabin safety sensor includes a vital signal detection operation, a counting operation, a reference setting operation, and a vital signal analysis operation. In the vital signal detection operation, a radar module scans a driver using radar signal and outputs at least one of heartbeat signals tracking heartbeats of the driver and respiratory signals tracking respiration of the driver. In the counting operation, a state determination unit counts at least one of a heart rate per minute using the heartbeat signals and a respiratory rate per minute using the respiratory signals provided by the radar module in real time. In the reference setting operation, the state determination unit calculates an average heart rate, which is an average value of the heart rates per minute obtained in the counting operation for a previous time, and uses the average heart rate as a reference heart rate, or calculates an average respiratory rate, which is an average value of the respiratory rates per minute obtained in the counting operation for the previous time, and uses the average respiratory rate as a reference respiratory rate.

In the vital signal analysis operation, the state determination unit determines that the driver is in a preliminary drowsy state, which indicates that the driver is entering a drowsy state when the number of times the heart rate per minute counted in real time falls between a first threshold percentage and a second threshold percentage of the reference heart rate is repeated a preset number of times or more within a preset time, or determines that the driver is in the preliminary drowsy state when the number of times the respiratory rate per minute counted in real time falls between a first threshold percentage and a second threshold percentage of the reference respiratory rate is repeated a preset number of times or more within a preset time. Here, the first threshold percentage and the second threshold percentage are less than 100%, and the second threshold percentage is greater than the first threshold percentage.

In an embodiment, the driver state predicting method of the in-cabin safety sensor may further include a heartbeat abnormality determination operation of determining, by the state determination unit, whether the heart rate per minute counted in real time is greater than or equal to a third threshold percentage of the reference heart rate. The state determination unit may generate a heartbeat abnormality event when the heart rate per minute counted in real time is greater than or equal to the third threshold percentage of the reference heart rate. Here, the third threshold percentage is greater than 100%.

In another embodiment, the driver state predicting method of the in-cabin safety sensor may further include a respiratory abnormality determination operation of determining, by the state determination unit, whether the respiratory rate per minute counted in real-time is greater than or equal to a third threshold percentage of the reference respiratory rate, wherein the third threshold percentage being a value greater than 100%. The state determination unit may generate a respiratory abnormality event when the respiratory rate per minute counted in real time is greater than or equal to the third threshold percentage of the reference respiratory rate.

<Calculation of Reference Heart Rate>

In an embodiment, the operation of using the calculated average heart rate as the reference heart rate may further include an operation of repeatedly obtaining, by the state determination unit, the average heart rate in unit of preset valid time and using an average heart rate obtained for an immediately preceding valid time as the reference heart rate for the next valid time, and an operation of maintaining, by the state determination unit, the reference heart rate used for the immediately preceding valid time without calculating an average heart rate for the immediately preceding valid time when the number of times the heart rate per minute counted in real time falls between the first threshold percentage and the second threshold percentage of the reference heart rate for the immediately preceding valid time is measured to be more than once but less than the preset number of times.

In another embodiment, the operation of using the calculated average heart rate as the reference heart rate may further include an operation of obtaining, by the state determination unit, an overall average value of the average heart rates each of which is obtained for each valid time, so that the average value of the average heart rates may be used as the reference heart rate.

<Using Image Analysis Together>

In another embodiment, the driver state predicting method of the in-cabin safety sensor may further include an operation of generating, by a first camera, an image of the driver by photographing the driver, an image analysis operation of extracting, by an image processing unit, a preliminary drowsy driving state by analyzing the image and recognizing a driver's state, wherein the driver's state for determining the preliminary drowsy state may correspond to a state in which the driver blinking his or her eyes a preset number of times or more for a preset time or a change in shape of the driver's nose or mouth, and an operation of determining, by the state determination unit, that the driver is in the preliminary drowsy driving state when it is determined that the driver is in the preliminary drowsy state both in the vital signal analysis operation and the image analysis operation for the valid time.

According to another aspect of the present invention, there is provided an in-cabin safety sensor. The in-cabin safety sensor includes a radar module that scans a driver using radar signal and outputs at least one of heartbeat signals by recognizing heartbeats of the driver or outputs respiratory signals by recognizing respiration of the driver, and a state determination unit that counts at least one of a heart rate per minute using the heartbeat signals provided by the radar module and the respiratory rate per minute using respiratory signals provided by the radar module.

When the number of times the heart rate per minute counted in real time falls between a first threshold percentage and a second threshold percentage of the reference heart rate is repeated a preset number of times or more within a preset time, or when the number of times the respiratory rate per minute counted in real time falls between a first threshold percentage and a second threshold percentage of the reference respiratory rate is repeated a preset number of times or more within a preset time, the state determination unit determines that the driver is in a preliminary drowsy state, which indicates that the driver is entering a drowsy state.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
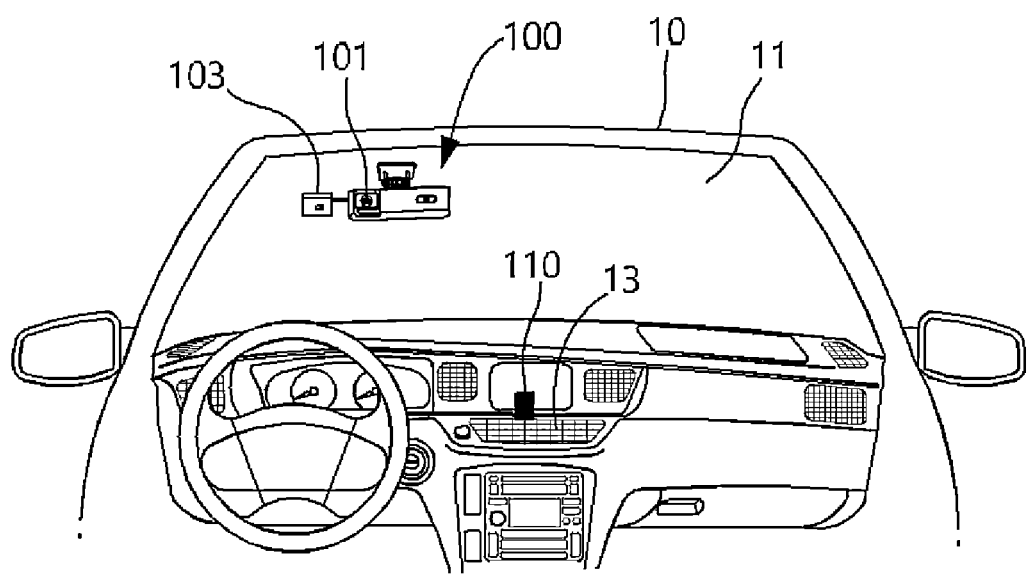
FIG. 1 is an installation diagram of an in-cabin safety sensor according to an embodiment of the present invention.
Figure 2:
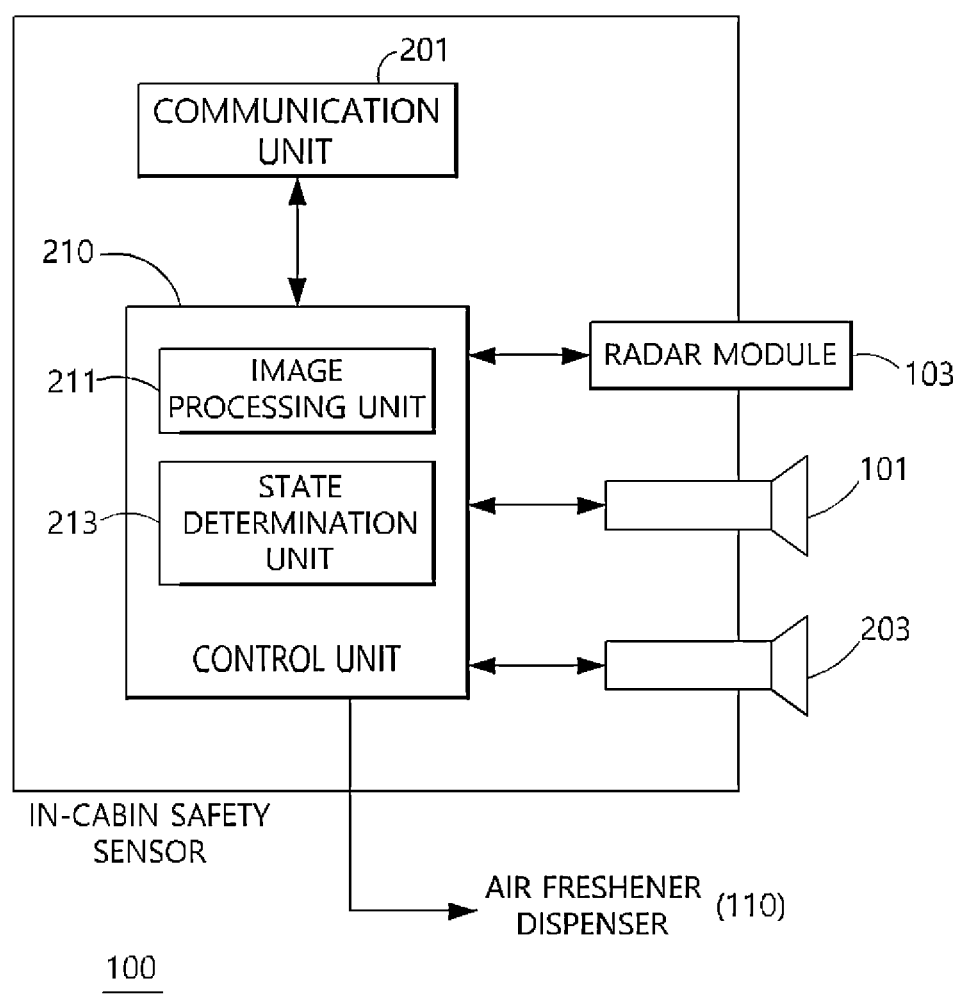
FIG. 2 is a block diagram of an in-cabin safety sensor according to an embodiment of the present invention.

Referring to FIGS. 1 and 2, an in-cabin safety sensor 100 of the present invention is installed inside a vehicle 10 and predicts and recognizes a driver's state.

The in-cabin safety sensor 100 of the present invention includes a communication unit 201, a first camera 101, a second camera 203, a radar module 103, and a control unit 210. In addition to these components, the in-cabin safety sensor 100 of the present invention may further include an input unit for receiving user commands, a display device, a global positioning system (GPS) module capable of generating location information, etc., but since these components are not essential components of the present invention, they are not shown and description thereof is omitted.

The communication unit 201 is a wireless network device for connection to an external server (not shown), and may be any wireless communication device that can connect to a network. For example, the communication unit 201 may be a device for accessing a mobile communication network such as a Long-Term Evolution (LTE) or 5G network, or a device for accessing a low-power broadband network such as a LoRa, Sigfox, Ingenu, Long-Term Evolution for Machines (LTE-M), or Narrowband Internet of things (NB-IoT) network. In addition, according to an embodiment, when the driver's mobile terminal (not shown) is equipped with a function to connect the in-cabin safety sensor 100 to the network, the communication unit 201 may be a wireless local area network (LAN) or Bluetooth device that can be connected to the driver's mobile terminal (not shown). Meanwhile, the communication unit 201 may be equipped with a wireless communication device that is connected to the network and wireless LAN and/or Bluetooth functions that are connected to the driver's mobile terminal (not shown).

The first camera 101 and the second camera 203 may be built in a main body of the in-cabin safety sensor 100, and one or both thereof may be implemented in the form of an external module connected to the main body.

The first camera 101 is used as a device to recognize the driver's state (e.g., drowsy driving, drug use, hypoglycemic shock, etc.) by photographing a vehicle driver and generating an image. Although the in-cabin safety sensor 100 may be installed anywhere, when the first camera 101 is intended to recognize the driver's state, it is preferable that the first camera 101 is installed above the front of the driver's seat as shown in FIG. 1.

The image generated by the first camera 101 may be of any type of image such as a black-and-white image, a color image, or an infrared image, but considering the influence of external light and night photographing, the infrared image is preferable.

The second camera 203 generates an image by photographing the outside of the vehicle, especially the frontward or rearward image of the vehicle. The second camera 203 may be built in the main body of the in-cabin safety sensor 100, but may be separated from the main body of the in-cabin safety sensor 100 and installed externally. The second camera 203 is for photographing a situation outside the vehicle, and is not an essential component of the present invention.

The radar module 103 performs anthropometric measurement using radar signals, and scans a driver and outputs a "heartbeat signal" tracking the driver's heartbeat and a "respiration signal" tracking driver's respiration to a state determination unit 213. The radar module 103 transmits the radar signals to the driver, and signals reflected from the driver become a combination of the heartbeat signal and the respiratory signal due to the Doppler effect. The radar module 103 receives the signals reflected from the driver, and classifies and processes heartbeat signals and respiration signals from the reflected signals. It is sufficient for the radar module 103 to be installed in the vehicle 10 at any location where the radar module 103 can scan the driver. In the example in FIG. 1, the radar module 103 is installed on a windshield 11 of the vehicle 10 and connected to the in-cabin safety sensor 100 through a cable, but according to another embodiment, the radar module 103 may be built in the in-cabin safety sensor 100.

It is recommended that the radar module 103 be installed at an upper portion of the windshield 11 to scan the driver without obstructions between the radar module 103 and the driver. In addition, the radar module 103 may be installed inside the driver's seat (not shown).

The radar module 103 may use various types of radar signals (radio waves) in the form of a Continuous Wave (CW), a Frequency Modulation Continuous Wave (FMCW), and an Ultra Wide Band (UWB), and uses the radar signals to scan the driver in real time at a preset cycle. Radio waves transmitted toward the driver are reflected with their characteristics changed by the Doppler effect according to the driver's heartbeat or respiration. A baseband signal received by the radar module 103 is a composite signal in which the respiratory signal and the heartbeat signal are simultaneously mixed. Generally, respiration is up to 40 times per minute, which corresponds to a frequency of 0.67 Hz (=40/60 sec), and heartbeat corresponds to a frequency of 1 to 3 Hz, and thus the radar module 103 may scan the driver at a rate of approximately 6 Hz (approximately once every ⅙ seconds), receive the reflected signal, and then separate the respiratory signal using a low pass filter having a center frequency of 0.7 Hz and separate the heartbeat signal using a high frequency pass filter of a 1 to 3 Hz band. The radar module 103 recognizes the received signal by separating the received signal into the respiratory signal and the heartbeat signal, and outputs a real-time heartbeat signal corresponding to the driver's heartbeat counted in real time or a real-time respiratory signal corresponding to the driver's respiration counted in real time.

As a method in which the radar module 103 recognizes the driver's heartbeat, conventionally known radar measurement technology, for example, Korean unexamined patent publication No. 10-2018-0104369, etc., may be used. In addition, there are already conventional methods of detecting the heart rate or respiratory rate using radar, such as the method of extracting phase change using CW radar or using range profile of FMCW (Korean unexamined patent publication No. 10-2023-0077605).

The control unit 210 controls an overall operation of the in-cabin safety sensor 100 of the present invention, including a function of monitoring the driver's state unique to the present invention. For the monitoring function of the present invention, the control unit 210 includes an image processing unit 211 and a state determination unit 213.

The image processing unit 211 performs object recognition necessary for determining the driver's state on an original image provided by the first camera 101 at a preset frame rate (e.g., 30 FPS, frames per seconds) and provides the recognition result to the state determination unit 213. The determination of the driver's state by the image processing unit 211 may be applied to hypoglycemic shock or drug use, but is mainly used for drowsy driving.

For object recognition necessary for the determination of drowsy driving, the image processing unit 211 performs image processing on all images provided by the first camera 101 to recognize objects of interest to be used in determining drowsy driving, such as the driver's face and eyes, cigarette, wireless phone, etc., and determines whether the driver is driving drowsy. Drowsy driving determination by the image processing unit 211 may be performed in various ways. For example, for an image in which an object of interest is recognized, the image processing unit 211 may recognize whether the driver is blinking or closing his or her eyes, and provide the recognition information to the state determination unit 213 for all images. In addition, the image processing unit 211 may recognize whether the driver's face or eyes are looking somewhere else other than the front, and whether a cigarette or wireless phone is recognized. In addition, the image processing unit 211 may recognize whether the driver is driving drowsy using an artificial intelligence algorithm for drowsy state recognition using changes in facial images for a certain period of time.

Meanwhile, as a method in which the image processing unit 211 recognizes an object and its gesture in an individual image, a conventionally developed and widely known image processing technique may be used as it is. Since a preprocessed infrared image contains almost no image information other than the face and outlines of the face and eyes are clear, the preprocessed infrared image is better at recognizing the driver's face and eye movements than using a color image. As a specific image processing method that the image processing unit 211 may use to recognize whether the driver is driving drowsy, a conventionally known method may be used and is not essential to the description of the present invention, and thus the description thereof is omitted.

The state determination unit 213 monitors the driver's driving state and predicts driver's drowsy driving, drug use, or hypoglycemic shock. To determine the driver's state, either vital signal analysis using the driver's heartbeat signal and/or respiratory signal provided by the radar module 103, or image analysis using the recognition results of the image processing unit 211 may be used, or the vital signal analysis and image analysis may be used together. In addition, the state determination unit 213 may analyze one of the heart rate and respiratory rate in the process of detecting the driver's drowsy driving, drug use, hypoglycemic shock, etc., or may analyze the heart rate and respiratory rate simultaneously.

The state determination unit 213 generates a "preliminary drowsy driving event" when drowsy driving is predicted as a result of the state determination, and generates a "drowsy driving event" when it is determined that the driver is driving drowsy as a result of the state determination. On the other hand, the state determination unit 213 generates a "heartbeat abnormality event" when the heart rate per minute is higher than a reference heart rate by a threshold value or more, or by a preset rate or more, such as in drug use or hypoglycemic shock, and generates a 'respiratory abnormality event' when the respiratory rate per minute is higher than a reference respiratory rate by a threshold value or more, or by a preset rate or more.

In drowsy driving analysis, changes in respiratory rate may be analyzed by using the same algorithm as in the heart rate analysis, and the respiratory abnormality event may also be processed with the same algorithm as the heartbeat abnormality event. Therefore, the following description will focus on the heartbeat analysis of the state determination unit 213, and the description of the algorithm for the heartbeat abnormality event may be applied as it is for the respiratory abnormality event, except that the reference respiratory rate, a first threshold percentage, a second threshold percentage, and a third threshold percentage are different from those of the heartbeat abnormality event.

First, for the heartbeat analysis, the state determination unit 213 counts the driver's real-time heartbeat signal provided by the radar module 103 and calculates the driver's real-time heart rate per minute. For example, when the radar module 103 scans the driver in unit of ⅙ seconds and outputs a heartbeat signal in unit of ⅙ seconds, the state determination unit 213 counts the driver's heart rate per minute using the heartbeat signals.

The state determination unit 213 determines that the driver is entering a drowsy state when the counted heart rate per minute is less than or equal to a first threshold percentage (e.g., 95%) compared to a preset reference heart rate. The first threshold percentage is a value less than 100%. For example, when the first threshold percentage is 95% and the reference heart rate is 70 beats per minute, when the heart beats per minute is less than 67 beats (first threshold percentage, 66.5), the driver is determined in a drowsy state. Therefore, if the counted heart rate per minute is 66 beats, the driver is determined to be in a drowsy state. In contrast, in cases of drug use or hypoglycemic shock, the driver's heart rate appears abnormally high. Therefore, since the driver's state is not normal even when the counted heart rate per minute is higher than the reference heart rate by a threshold value or more, the state determination unit 213 determines that there is an abnormality in the driver's heartbeat state when the heart rate per minute is greater than or equal to the third threshold percentage (e.g., 120%). The third threshold percentage is a value greater than 100%.

Here, the reference heart rate refers to heartbeats per minute and is determined differently for each driver. Since the same driver's heart rate may rise even in a normal state, such as singing while driving, in the present invention, the reference heart rate of a specific driver is not fixed, but is changed to reflect the driver's current state. To set the reference heart rate, the state determination unit 213 calculates an "average heart rate," which is an average value of "real-time heartbeats per minute" calculated for a certain period of time (e.g., in unit of 5 or 10 minutes, hereinafter referred to as "valid time"), and uses the average heart rate as the reference heart rate. The state determination unit 213 periodically obtains the average heart rate and changes the reference heart rate to reflect the driver's state in the driver's reference heart rate. For example, a periodically repeating valid time may be set, and an average heart rate of the preceding valid time may be used as a reference heart rate for the next valid time. The state determination unit 213 obtains the average heart rate in each valid time unit and uses the average heart rate as the reference heart rate to respond to changes in the heart rate even when the driver is not in a drowsy driving state, such as when the driver sings a song or has a psychological change while driving, etc. As described above, the reference respiratory rate may also be set for each driver in the same way.

Table 1 is an example of real-time heart rates per minute counted by the state determination unit 213 for 10 minutes.

TABLE 1

| t1 | t2 | t3 | t4 | t5 | t6 | t7 | t8 | t9 | t10 |
|---|---|---|---|---|---|---|---|---|---|
| 69 | 70 | 71 | 72 | 72 | 71 | 70 | 69 | 69 | 70 |

Based on Table 1, when an average heart rate, which is an average value of heart rates per minute for 10 minutes, is obtained using the results from t1 to t10, the average heart rate is 70.3, and the state determination unit 213 may set 70 as a reference heart rate to be used from t11.

According to another embodiment, additionally, the state determination unit 213 may use, as the reference heart rate, an average value of the average heart rates obtained while repeating multiple valid times over several hours, an average value of the average heart rates obtained while repeating more valid times over a longer period of time (e.g., 24 hours), or an average value of all average heart rates obtained so far. The average of the average heart rates obtained in unit of valid time for several hours or longer (e.g., 24 hours), corresponds to an average of all heartbeats per minute for the corresponding period. Because immediately applying changes in the reference heart rate due to changes in the driver's psychology while driving may cause errors in the heart rate analysis for detecting driver drowsy driving, the average value over a longer period of time may be used.

According to an embodiment, the reference heart rate may be effectively used until the next average heart rate is calculated. Therefore, the state determination unit 213 may determine the driver's heart rate state (drowsy driving, preliminary drowsy driving, drug use, etc.) at the next valid time by using the average heart rate determined at immediately preceding valid time as the reference heart rate. In this case, during a section in which the average heart rate is calculated, there should be no unusual changes, including the driver's "drowsy driving event," "preliminary drowsy driving event," or "heartbeat abnormality event." Therefore, when the number of times the real-time heart rate per minute falls between the first threshold percentage and second threshold percentage of the reference heart rate for the immediately preceding valid time is measured less than a preset number of times or is measured even once, the state determination unit 213 may maintain the reference heart rate used for the immediately preceding valid time as the reference heart rate for the next valid time without recalculating the average heart rate for the immediately preceding valid time. For example, when the number of times the real-time heart rate per minute falls between the first threshold percentage and second threshold percentage of the reference heart rate during a period of time from t1 to t10 is measured even once, the reference heart rate used during a period from t1 to t10 (the average heart rate obtained before t1) is used as the reference heart rate during a period from t11 to t20, and the average heart rate during the period from t1 to t10 is not calculated.

Meanwhile, in the case of drowsy driving, the driver may repeatedly doze off and wake up before entering a drowsy state. In terms of preventing drowsy driving, it is very important to catch the repeatedly dozing off and waking up.

Therefore, the state determination unit 213, when the number of transitions to a value between the first threshold percentage and the second threshold percentage (e.g. 97%), i.e., a value greater than the first threshold percentage and less than the second threshold percentage is repeated a preset number of times or more (e.g., 2 times) within a certain time (e.g., 5 minutes), may determine that the driver is in a "preliminary drowsy state," which is a state in which the driver is entering a drowsy state. The first threshold percentage and the second threshold percentage are values less than 100%, and the second threshold percentage is a value greater than the first threshold percentage.

Table 2 is an example of the driver's heart rate per minute measured following Table 1, and the driver's reference heart rate is calculated and set to 70.

TABLE 2

| t11 | t12 | t13 | t14 | t15 | t16 | t17 | t18 | t19 | t20 |
|-----|-----|-----|-----|-----|-----|-----|-----|-----|-----|
| 70  | 69  | 68  | 70  | 70  | 70  | 68  | 69  | 70  | 70  |

For example, in the case where the reference heart rate is 70 beats per minute in the case where the first threshold percentage is set to 95% and the second threshold percentage is set to 97%, when a heart rate per minute that falls between the first threshold percentage (95%, 66.5) and the second threshold percentage (97%, 67.9), i.e., 67 or 68 beats per minute occurs twice or more in 5 minutes, the driver's state is determined to be in a "semi-drowsy" or "preliminary drowsy" state. In Table 2, since the heart rate per minute was 68 at t13 and t17, which fall within 5 minutes, the state determination unit 213 may determine that the driver is in the preliminary drowsy state.

The state determination unit 213 monitors whether there is a "preliminary drowsy driving event" in which the driver's drowsy driving is recognized from the image analysis results of the image processing unit 211. The conditions for generating the "preliminary drowsy driving event" may be set in various ways. For example, whether the drive is in the preliminary drowsy driving state may be determined by whether eye blinking lasts longer than a first reference time. When eye blinking is recognized repeatedly more than 15 times in 1 minute, the driver may be determined to be in the preliminary drowsy driving state.

According to an embodiment, when determining the driver's state using the heartbeat analysis, the state determination unit 213 may determine the driver's state by using the image analysis of the image processing unit 211 together.

Hereinafter, with reference to FIG. 3, a driver state predicting method of the in-cabin safety sensor 100 of the present invention will be described. Meanwhile, the description made with reference to FIG. 3 will focus on predicting the driver's drowsy driving.

<Vital Signal Counting: S301 and S303>

The radar module 103 scans the driver at a preset cycle using radar signals for driver's vital signal analysis, recognizes a signal corresponding to the driver's heartbeat from a signal reflected from the driver, and outputs a heartbeat signal (S301).

The state determination unit 213 counts the heartbeat signals provided by the radar module 103 and calculates a heart rate per minute. For example, when the radar module 103 scans the driver in unit of 0.5 seconds and outputs a heartbeat signal in unit of 0.5 seconds, the state determination unit 213 calculates the driver's heart rate per minute by counting the heartbeat signals (S303).

The processing of operations S301 and S303 is also applied to the output of the respiratory signal by the radar module 103 and the counting of the respiratory rate per minute by the state determination unit 213.

<Reference Setting: S305>

The state determination unit 213 calculates an average value of the driver's heart rates per minute accumulated by repeatedly performing operation S303 during the immediately preceding valid time and uses the average value as the reference heart rate to be used in determination of S309 during the next valid time.

When there is a value that falls between the first threshold percentage and the second threshold percentage of the reference heart rate among the driver's heart rates per minute accumulated during the immediately preceding valid time, the state determination unit 213 does not calculate an average value of the driver's heart rates per minute accumulated during the immediately preceding valid time, and maintains the reference heart rate in use as it is. A value between the first threshold percentage and the second threshold percentage is related to preliminary drowsy driving, and is intended to prevent the reference heart rate from being calculated based on the heart rate measured while drowsy driving is suspected.

According to another embodiment, additionally, the state determination unit 213 may calculate the driver's average heart rate while driving by obtaining the average value of the average heart rates obtained in unit of valid time for several hours or longer (e.g., for 24 hours), and then use the average value as the reference heart rate. By using the average of the average heart rates for a longer period of time as the reference heart rate, it is possible to prevent the reference heart rate from easily changing depending on the driver's state.

The processing of operation S305 is applied as it is when the state determination unit 213 sets the reference respiratory rate.

<Driver State Recognition by Photographing Driver by First Camera: S307 and S309>

The first camera 101 photographs a driver while driving, generates images at a preset frame rate, and provides the images to the image processing unit 211 (S307). The image processing unit 211 analyzes the image provided by the first camera 101 and recognizes a drowsy driving state among driver's states (S309).

<Determination of Whether Driver is Driving Preliminary Drowsy: S311 to S315>

The state determination unit 213 may perform a "heart rate analysis operation" to determine that the driver is in a "preliminary drowsy state," which is a state in which the driver enters a drowsy state, when the number of times the heart rate per minute counted in operation S303 is converted to a value less than the second threshold percentage and greater than the first threshold percentage of the reference heart rate applied to the current valid time is repeated a preset number of times or more (e.g., 3 times) within a certain time (e.g., 5 minutes). Similarly, the state determination unit 213 may perform a "respiration analysis operation" to determine that the driver is in a "preliminary drowsy state," which is a state in which the driver enters a drowsy state, when the number of times the respiratory rate per minute is converted to a value less than the second threshold percentage and greater than the first threshold percentage of the reference heart rate applied to the current valid time is repeated a preset number of times or more (e.g., 3 times) within a certain time (e.g., 5 minutes). As described above, the second threshold percentage (e.g., 97%) is a value greater than the first threshold percentage, and the first threshold percentage and the second threshold percentage may be different values in the heart rate analysis and in the respiration analysis.

According to an embodiment, in order to increase the accuracy of determination of the preliminary drowsy state, the state determination unit 213 may also consider the "image analysis" in which the driver's state analyzed by the image processing unit 211 is considered in operation S307. In this case, it is sufficient that the driver's condition for determining the preliminary drowsy state is not normal. More specifically, the image processing unit 211 may recognize the preliminary drowsy state by recognizing that the driver blinks his or her eyes a preset number of times or more for a preset time or by recognizing changes in the shape of other parts of the driver's face (such as the nose or mouth). For example, the image processing unit 211 may recognize whether there is the "preliminary drowsy driving" using an artificial intelligence algorithm for preliminary drowsy state recognition using changes in facial images for a certain period of time.

In operation S315, the state determination unit 213 may finally determine that the driver is in the "preliminary drowsy state" only when it is determined that the driver is in the "preliminary drowsy state" in operation S307 based on the change in heart rate per minute (or the change in respiratory rate per minute) counted in operation S303 within the current valid time and the image processing unit 211 also recognizes the driver as being in the preliminary drowsy state in operation S313.

<Drowsy Driving Determination: S317 and S319>

When the heart rate per minute is the first threshold percentage of the reference heart rate (e.g., 95%) applied to the current valid time or less, or the respiratory rate per minute is the first threshold percentage of the reference respiratory rate (e.g., 95%) applied to the current valid time or less, it is determined that the driver is entering a drowsy state.

According to an embodiment, even in the drowsy driving determination, the state determination unit 213 may ultimately determine that the driver is in the "drowsy state" only when the image processing unit also recognizes the driver as being in a drowsy state while the driver is determined to be in the "drowsy state" based on the change in heart rate per minute counted in operation S303.

Meanwhile, when the driver is determined to be in the preliminary drowsy state in S315 or in the drowsy state in S319, air freshener can be sprayed to wake up the driver or call the driver's attention. To this end, the in-cabin safety sensor 100 of the present invention may be connected to an air freshener dispenser 110 of FIG. 2. In this case, the state determination unit 213 may provide a signal to the air freshener dispenser 110 when the driver is determined to be in the preliminary drowsy state in S315 or determined to be in the drowsy state in S319.

The air freshener dispenser 110 is configured to spray a preset amount of air freshener by operating according to a signal from the in-cabin safety sensor 100, and is preferably placed in front of an air vent 13 of the vehicle 10. The method in which the air freshener dispenser 110 sprays air freshener may be implemented in various ways. For example, the air freshener dispenser 110 is equipped with an ultrasonic humidifying device and may operate to spray a certain amount of air freshener once when there is a signal indicating the preliminary drowsy state from the in-cabin safety sensor 100, and operate to spray a certain amount of air freshener twice when there is a signal from the in-cabin safety sensor 100 indicating the drowsy state.

With the method described above, the drowsy driving predicting method of the in-cabin safety sensor 100 of the present invention is performed. As described above, operations S307 and S309, which are processing based on the image analysis, are not essential configurations of the present invention.

"Heartbeat Abnormality Event" and "Respiratory Abnormality Event"

Figure 3:
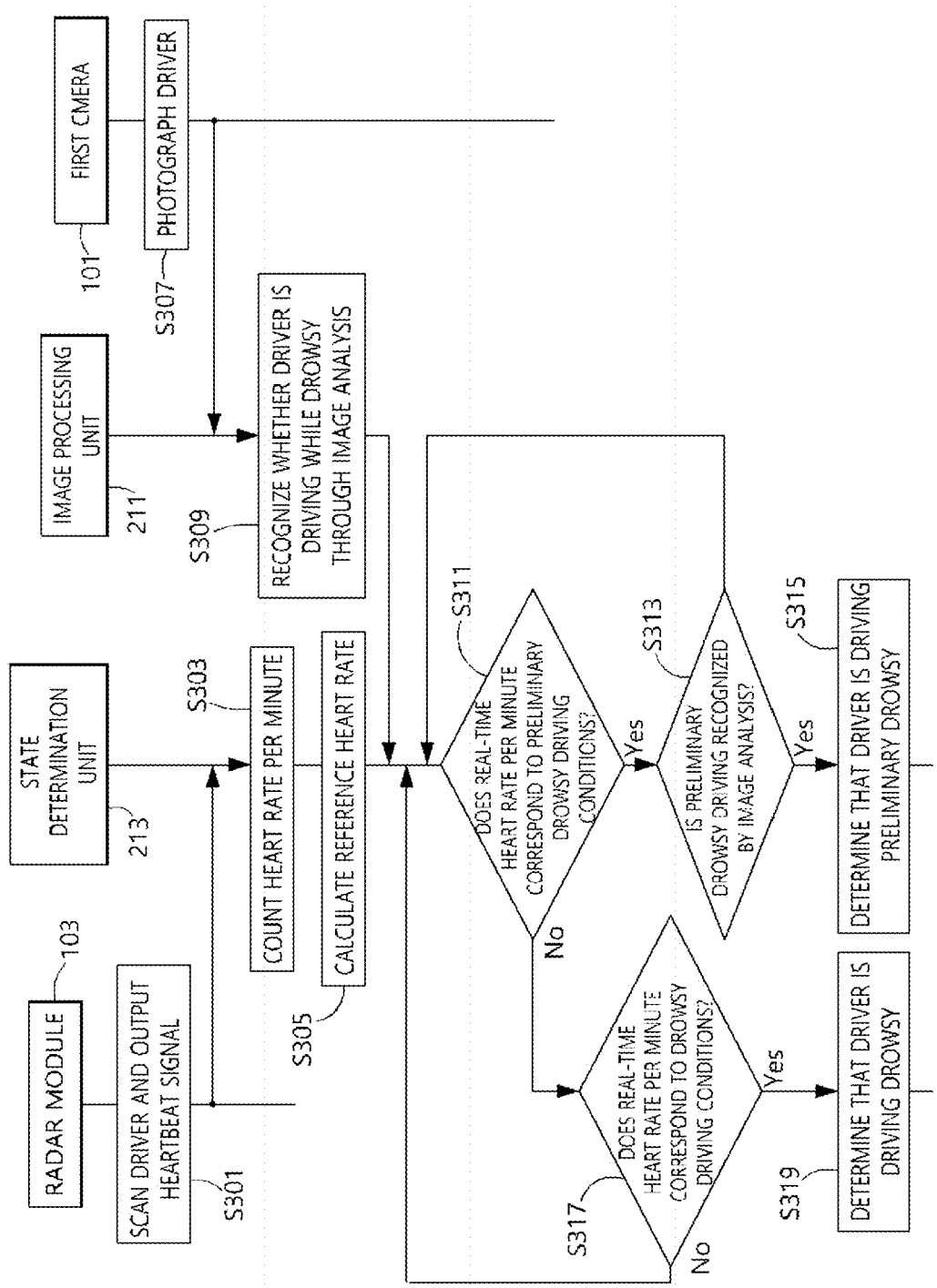
FIG. 3 is a flowchart provided for describing a driver state (drowsy driving) predicting method according to an embodiment of the present invention.
Figure 4:
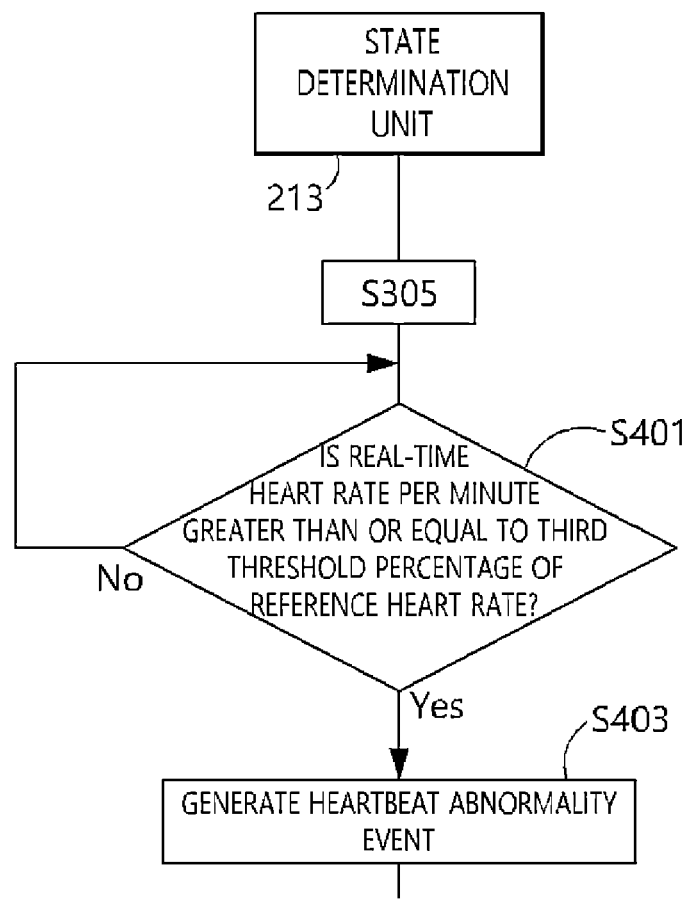
FIG. 4 is a flowchart provided for describing a driver state (heartbeat abnormality event) predicting method according to another embodiment of the present invention.

Meanwhile, the generation of a "heartbeat abnormality event" in which the driver's heart rate measured using radar is greater than or equal to the third threshold percentage of the reference heart rate, or the generation of a "respiratory abnormality event" in which the driver's respiratory rate measured using radar is greater than or equal to the third threshold percentage of the reference respiratory rate is also performed in the same way as in FIG. 3. FIG. 4 illustrates a driver state predicting method according to another embodiment of the present invention and corresponds to a description of the method of generating a heartbeat abnormality event. And FIG. 4 is also applied to the generation of a respiratory abnormality event. The method of FIG. 4 may further include a "heartbeat abnormality determination operation (S401 and S403)" following operation S305 of FIG. 3.

First, the state determination unit 213 determines whether the driver's real-time heart rate per minute is greater than or equal to the third threshold percentage of the reference heart rate, separately from operation S311 (S401).

When it is determined in operation S401 that the driver's heart rate per minute is greater than or equal to the third threshold percentage of the reference heart rate, the state determination unit 213 generates the heartbeat abnormality event (S403).

Similarly, the state determination unit 213 determines whether the driver's real-time respiratory rate per minute is greater than or equal to the third threshold percentage of the reference respiratory rate, separately from step S311. when it is determined the driver's respiratory rate per minute is greater than or equal to the third critical percentage of the standard respiratory rate, the state determination unit 213 generates the respiratory abnormality event.

The in-cabin safety sensor of the present invention can monitor a driver's heart rate or respiratory rate by counting the driver's heart rate or respiratory rate in a non-contact manner using radar, and can predict driver's drowsy driving, drug use, hypoglycemic shock, etc., by monitoring changes in the heart rate or respiratory rate.

In addition, in the case of drowsy driving, the in-cabin safety sensor of the present invention can predict the driver's drowsy driving in advance by considering results determining preliminary drowsy driving and drowsy driving based on image analysis of images obtained by photographing the driver, along with the heart rate monitoring.

Although exemplary embodiments of the present invention have been shown and described, the present invention is not limited to the specific embodiments described above, and may be implemented in various modifications by those skilled in the art without departing from the gist of the invention as claimed in the claims. Of course, these modified implementations should not be understood individually from the technical idea or perspective of the present invention.

What is claimed is:

1. A driver state predicting method of an in-cabin safety sensor, comprising:

an operation of scanning, by a radar module, a driver using radar signal and outputting at least one of heartbeat signals tracking heartbeats of the driver and respiratory signals tracking respiration of the driver;

an operation of counting, by a state determination unit, at least one of a heart rate per minute using the heartbeat signals and a respiratory rate per minute using the respiratory signals provided by the radar module in real time;

an operation of calculating, by the state determination unit, an average heart rate, which is an average value of the heart rates per minute obtained in the operation of counting for a previous time, and using the average heart rate as a reference heart rate, or calculating an average respiratory rate, which is an average value of the respiratory rates per minute obtained in the operation of counting for the previous time, and using the average respiratory rate as a reference respiratory rate; and a vital signal analysis operation of determining, by the state determination unit, that the driver is in a preliminary drowsy state, indicating that the driver is entering a drowsy state when the number of times the heart rate per minute counted in real time falls between a first threshold percentage and a second threshold percentage of the reference heart rate is repeated a preset number of times or more within a preset time, or determining that the driver is in the preliminary drowsy state when the number of times the respiratory rate per minute counted in real time falls between a first threshold percentage and a second threshold percentage of the reference respiratory rate is repeated a preset number of times or more within a preset time, wherein the first threshold percentage and the second threshold percentage are less than 100%, and the second threshold percentage is greater than the first threshold percentage.

2. The driver state predicting method of claim 1, further comprising a heartbeat abnormality determination operation of determining, by the state determination unit, whether the heart rate per minute counted in real time is greater than or equal to a third threshold percentage of the reference heart rate, wherein the third threshold percentage is greater than 100%, wherein the state determination unit generates a heartbeat abnormality event when the heart rate per minute counted in real time is greater than or equal to the third threshold percentage of the reference heart rate.

3. The driver state predicting method of claim 1, wherein the operation of using the average heart rate as the reference heart rate further includes:

an operation of repeatedly obtaining, by the state determination unit, the average heart rate in unit of preset valid time and using an average heart rate obtained for an immediately preceding valid time as the reference heart rate for the next valid time; and an operation of maintaining, by the state determination unit, the reference heart rate used for the immediately preceding valid time without calculating the average heart rate for the immediately preceding valid time when the number of times the heart rate per minute counted in real time falls between the first threshold percentage and the second threshold percentage of the reference heart rate for the immediately preceding valid time is measured to be more than once but less than the preset number of times.

4. The driver state predicting method of claim 3, wherein the operation of using the calculated average heart rate as the reference heart rate includes an operation of obtaining, by the state determination unit, an overall average value of the average heart rates each of which is obtained for each valid time, and the average value of the average heart rates is used as the reference heart rate.

5. The driver state predicting method of claim 1, further comprising a respiratory abnormality determination operation of determining, by the state determination unit, a respiratory abnormality by determining whether the respiratory rate per minute counted in real-time is greater than or equal to a third threshold percentage of the reference respiratory rate, wherein the third threshold percentage is greater than 100%, wherein the state determination unit generates a respiratory abnormality event when the respiratory rate per minute counted in real time is greater than or equal to the third threshold percentage of the reference respiratory rate.

6. The driver state predicting method of claim 1, further comprising:

an operation of generating, by a first camera, an image of the driver by photographing the driver;

an image analysis operation of analyzing, by an image processing unit, the image and extracting a preliminary drowsy driving state while recognizing the driver's state, wherein the driver's state for determining the preliminary drowsy state corresponds to a state in which the driver blinks his or her eyes a preset number of times or more for a preset time or a change in shape of the driver's nose or mouth; and an operation of determining, by the state determination unit, that the driver is in the preliminary drowsy driving state when it is determined that the driver is in the preliminary drowsy state both in the vital signal analysis operation and the image analysis operation for the valid time.

7. An in-cabin safety sensor comprising:

a radar module that scans a driver using radar signal and outputs heartbeat signals tracking heartbeats of the driver or outputs respiratory signals tracking respiration of the driver; and a state determination unit that counts at least one of a heart rate per minute using the heartbeat signals provided by the radar module and a respiratory rate per minute using the respiratory signals provided by the radar module in real time, wherein, when the number of times the heart rate per minute counted in real time falls between a first threshold percentage and a second threshold percentage of a reference heart rate is repeated a preset number of times or more within a preset time, or when the number of times the respiratory rate per minute counted in real time falls between a first threshold percentage and a second threshold percentage of a reference respiratory rate is repeated a preset number of times or more within a preset time, the state determination unit performs vital signal analysis to determine that the driver is in a preliminary drowsy state, which indicates that the driver is entering a drowsy state, wherein the reference heart rate uses an average heart rate which is an average value of the heart rates per minute obtained by counting for a previous time, the reference respiratory rate uses an average respiratory rate which is an average value of the respiratory rates per minute obtained by counting for a previous time, the first threshold percentage and the second threshold percentage are less than 100%, and the second threshold percentage is greater than the first threshold percentage.

8. The in-cabin safety sensor of claim 7, wherein the state determination unit generates a heartbeat abnormality event when it is determined that the heart rate per minute counted in real time is greater than or equal to a third threshold percentage of the reference heart rate, and the third threshold percentage is a value greater than 100%.

9. The in-cabin safety sensor of claim 7, wherein the state determination unit is configured to:

repeatedly obtain the average heart rate in unit of preset valid time and use an average heart rate obtained for an immediately preceding valid time as the reference heart rate for the next valid time; and maintain the reference heart rate used for the immediately preceding valid time without calculating the average heart rate for the immediately preceding valid time when the number of times the heart rate per minute counted in real time falls between the first threshold percentage and the second threshold percentage of the reference heart rate for the immediately preceding valid time is measured to be more than once but less than the preset number of times.

10. The in-cabin safety sensor of claim 9, wherein the state determination unit obtains an overall average value of the average heart rates each of which is obtained for each valid time, and uses the average value of the average heart rates as the reference heart rate.

11. The in-cabin safety sensor of claim 7, further comprising:

a first camera that generates an image of the driver by photographing the driver; and an image processing unit that analyzes the image and extracts a preliminary drowsy driving state while recognizing the driver's state, wherein the driver's state for determining the preliminary drowsy state corresponds to a state in which the driver blinks his or her eyes a preset number of times or more for a preset time or a change in shape of the driver's nose or mouth, wherein the state determination unit determines that the driver is in a preliminary drowsy driving state when, for the valid time, it is determined that the driver is in the preliminary drowsy state by the vital signal analysis and the image processing unit extracts a preliminary drowsy driving state.

12. The in-cabin safety sensor of claim 7, wherein the state determination unit generates a respiratory abnormality event when it is determined that the respiratory rate per minute counted in real time is greater than or equal to a third threshold percentage of the reference respiratory rate, and the third threshold percentage is greater than 100%.

* * * * *